Jan. 3, 1928.

M. B. DAVIS 1,654,866

PIPE CLAMP

Filed Aug. 10, 1925

INVENTOR
Marvin B. Davis.
BY
ATTORNEY

Jan. 3, 1928.
M. B. DAVIS
1,654,866
PIPE CLAMP
Filed Aug. 10, 1925
5 Sheets-Sheet 2
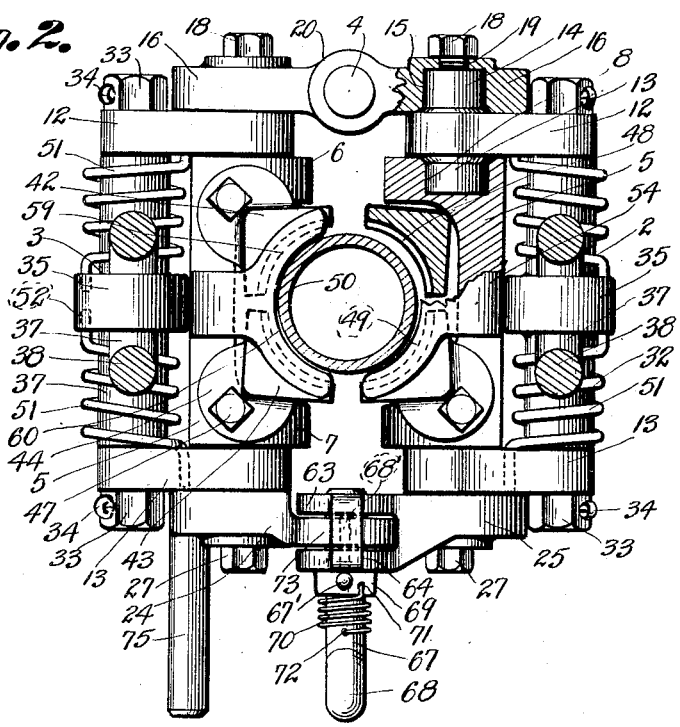
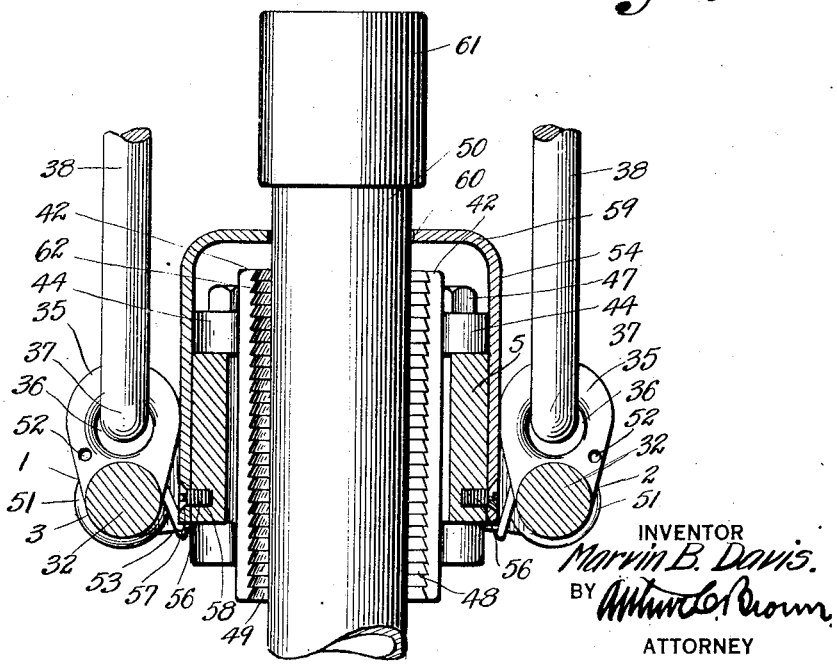
INVENTOR
Marvin B. Davis.
BY
ATTORNEY Jan. 3, 1928.

M. B. DAVIS 1,654,866

PIPE CLAMP

Filed Aug. 10, 1925

INVENTOR
Marvin B. Davis.
BY
ATTORNEY

Jan. 3, 1928.

M. B. DAVIS 1,654,866

PIPE CLAMP

Filed Aug. 10, 1925

INVENTOR
Marvin B. Davis.
BY
ATTORNEY

Jan. 3, 1928.
M. B. DAVIS
1,654,866
PIPE CLAMP
Filed Aug. 10, 1925    5 Sheets-Sheet 5
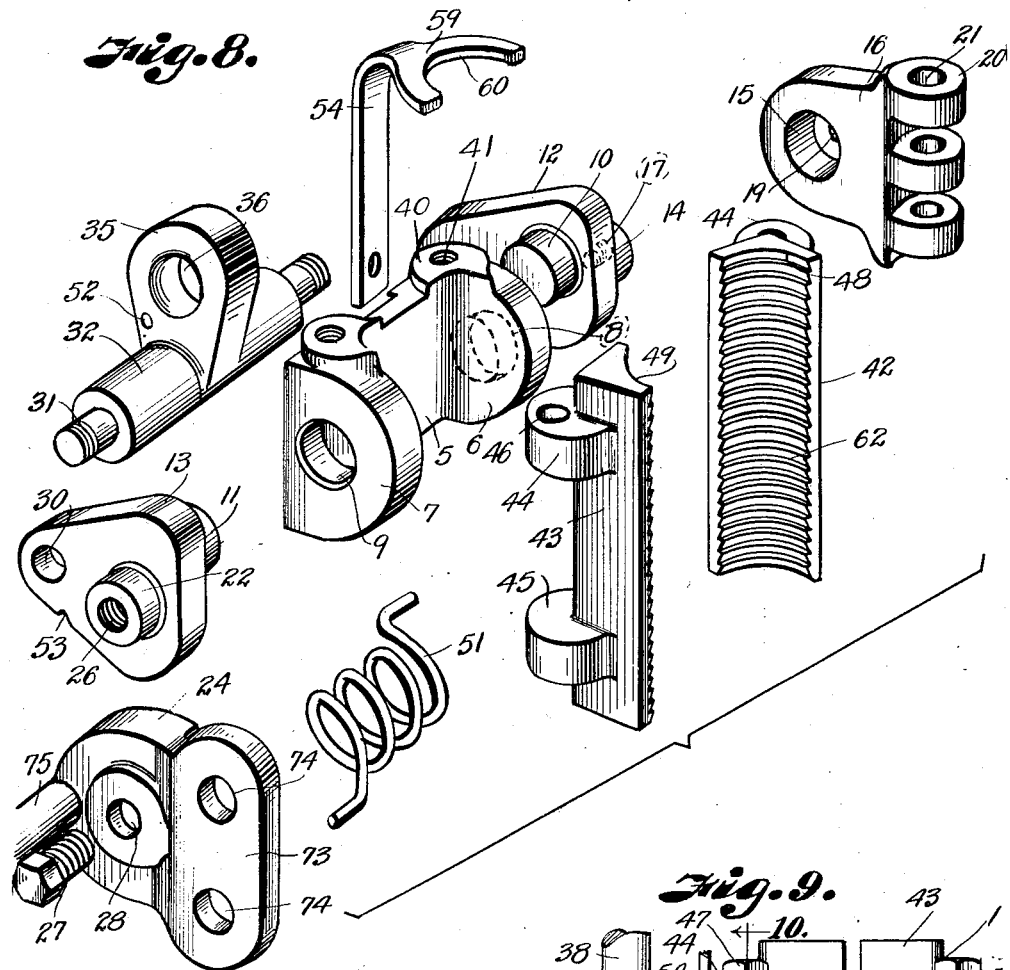
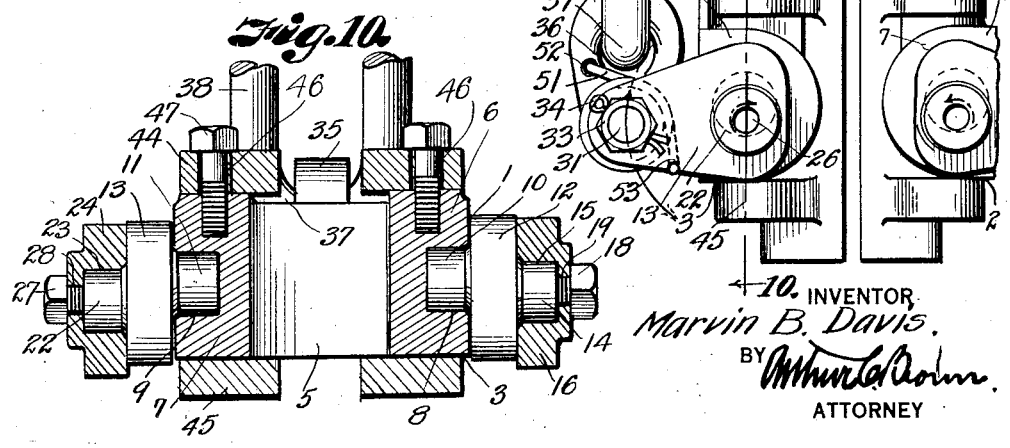
INVENTOR
Marvin B. Davis.
BY
ATTORNEY Patented Jan. 3, 1928.

1,654,866

UNITED STATES PATENT OFFICE.

MARVIN B. DAVIS, OF KANSAS CITY, MISSOURI, ASSIGNOR TO GEORGE KRELL, OF SAPULPA, OKLAHOMA.

PIPE CLAMP.

Application filed August 10, 1925. Serial No. 49,481.

My invention relates to a pipe clamp of that character employed in oil well drilling operations, and more particularly to one for use in pulling or setting casing, tubing or rods, and which will hereinafter be referred to as "pipe" with the understanding that such term is sufficiently comprehensive to include any form of object with which the invention may be employed; the principal object of the present invention being to effect application of the clamp to the body of the tubing as distinguished from the connections.

In both pulling and setting it is desirable to grip the pipe as near the end of a section as possible and in some forms of clamp heretofore employed the load has been applied to the connecting or coupling collar, with the not infrequent result that the collar collapsed under the strain. With my improvements I avoid this injurious application of the load, but I do, however, employ the collars as feelers for effecting application of the clamp to the desired portion of the section of pipe to be pulled or set.

In accomplishing this and other objects of the invention I have provided improved details of structure hereinafter described and illustrated in the accompanying drawings, wherein Fig. 1 is a perspective view of a clamp embodying my improvement, showing the clamp open for application to a section of pipe.

Fig. 2 is a plan view of the clamp, showing it on a pipe, but before the jaws are set.

Fig. 3 is an enlarged, vertical section of the clamp jaws, showing their setting members in feeling relation to a pipe.

Fig. 8 is a detail view of one pair of clamp jaws and a set of frame members, the parts being disassembled, but in substantially their relative positions.

Fig. 9 is a side view of the clamp jaws, showing their double pivot mountings, and Fig. 10 is a vertical section on the line 10—10 of Fig. 9.

Figure 1:
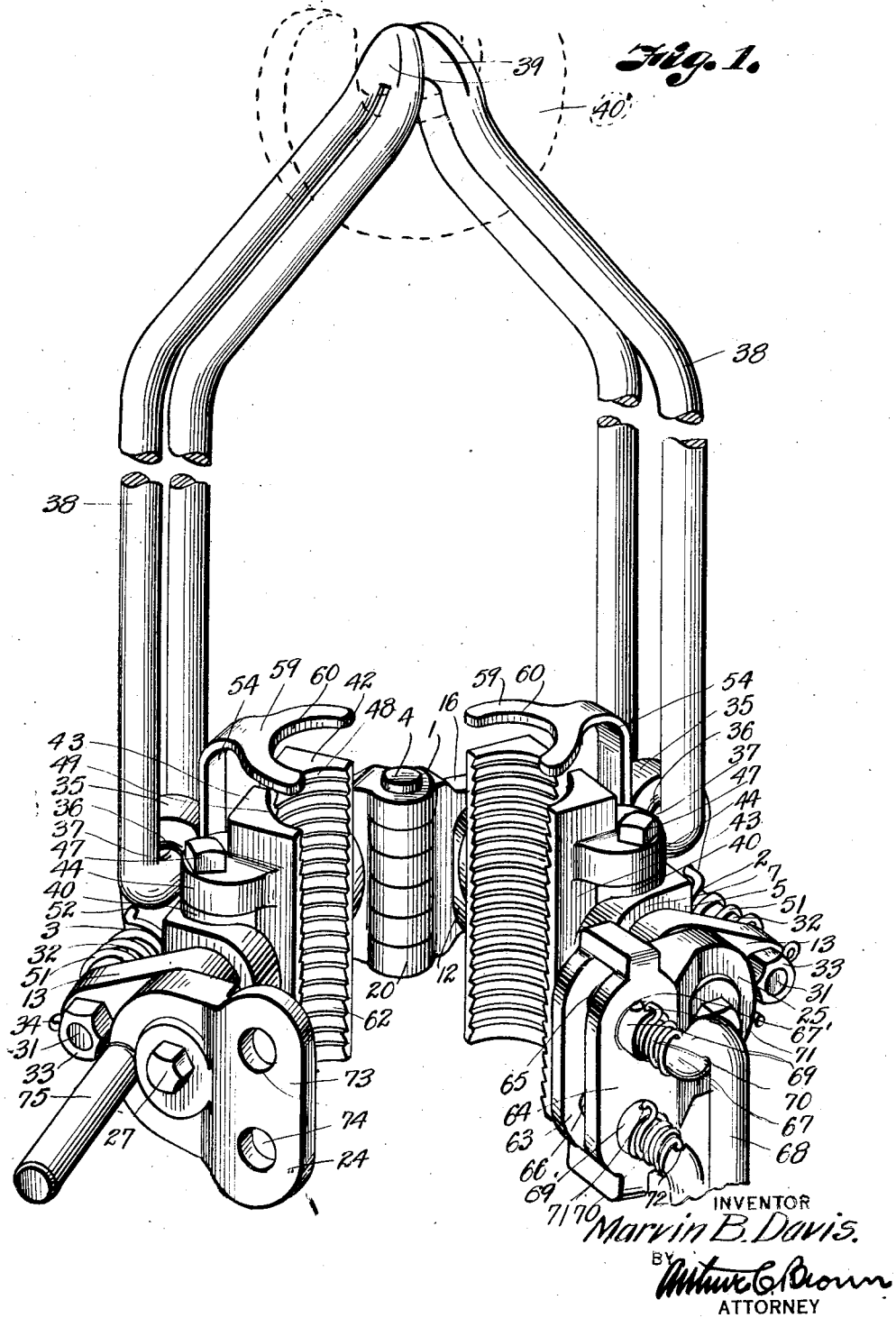
Figure 5:
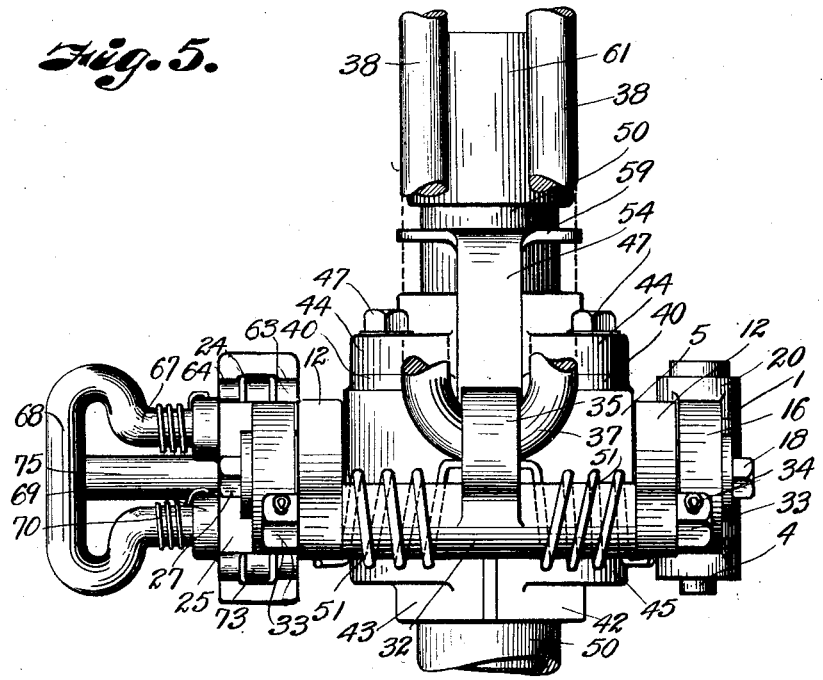
Fig. 5 is a side elevation of the clamp, the hanger link being broken away.
Figure 4:
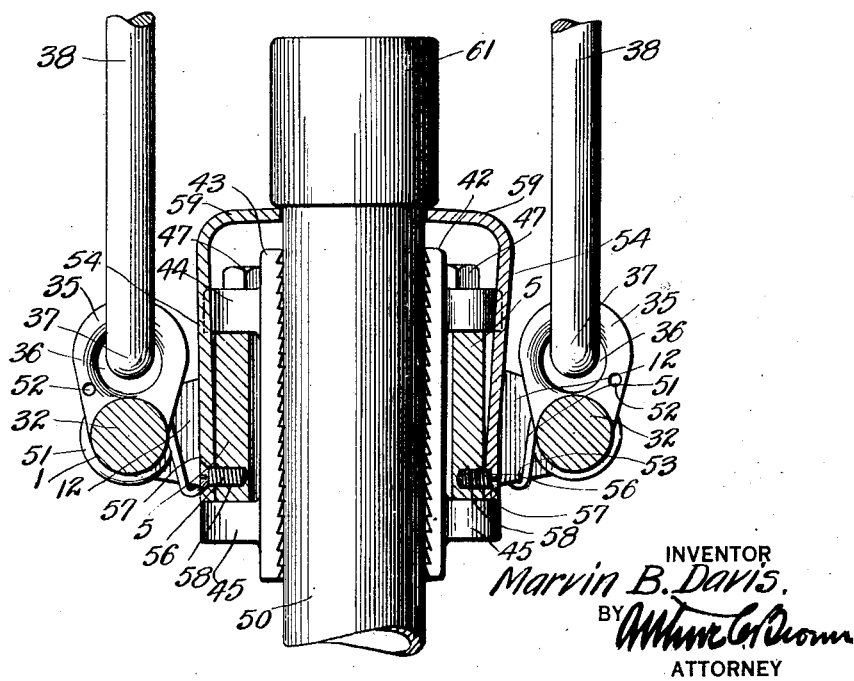
Fig. 4 is a similar view, showing the jaws set against the pipe.
Figure 6:
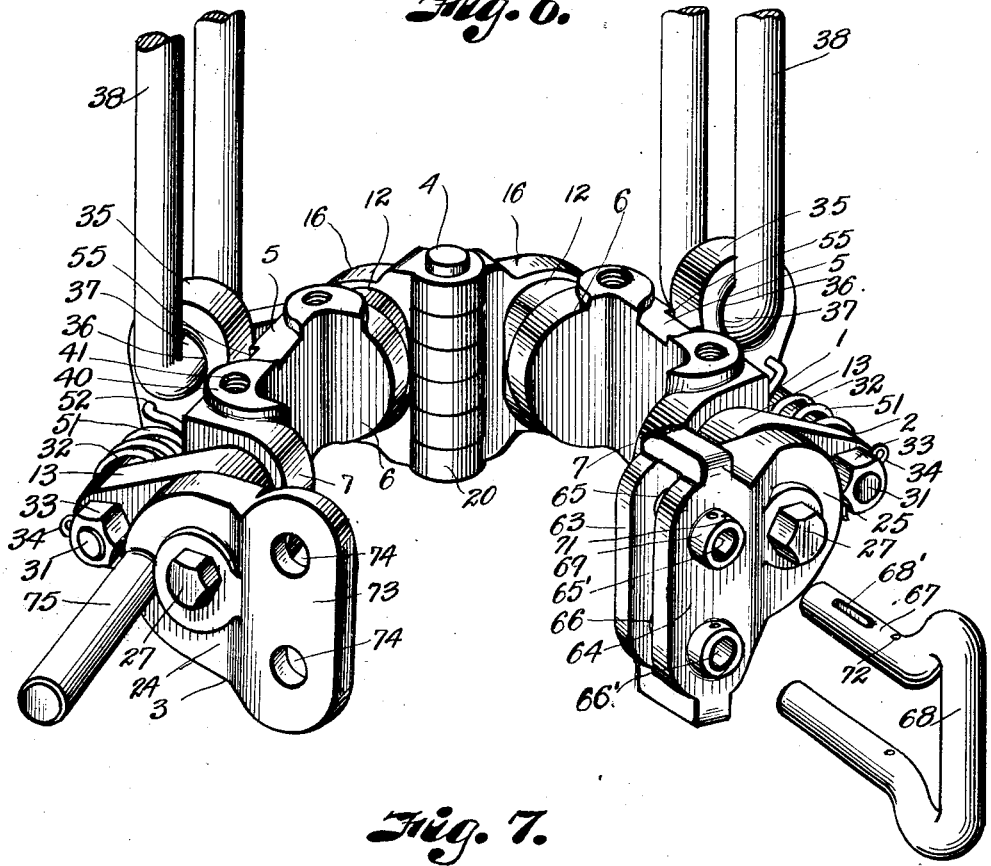
Fig. 6 is a detail perspective view of the clamp frame, the jaws being removed for better illustration.
Figure 7:
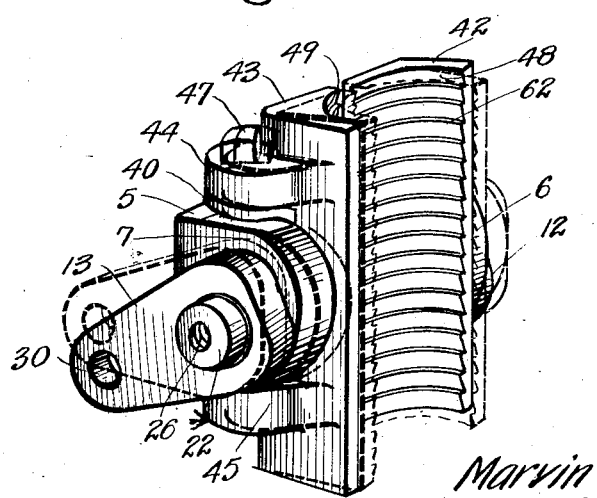
Fig. 7 is a detail perspective view of one pair of clamp jaws, illustrating its double pivot mounting by dotted lines.

Referring more in detail to the drawings, 1 (Figs. 1, 2, 6 and 8) designates a carrying frame, 2 and 3 comprising right and left halves hingedly connected by a pin 4 to open and close about a pipe, and upon which the respective jaw members are adjustably mounted, the frame members being duplicates except for the latch elements hereinafter described.

Each half of the frame comprises a central, U-shaped head 5, the ears 6 and 7 of which merge into the base on curved lines to provide suitable backing for the jaw members and have end pockets 8, 9, forming bearings for the trunnions 10, 11 on the inner faces of crank blocks 12, 13. The rear crank block 12 has a crank stud 14 on its outer face, down-set from its trunnion 10 and rotatable in a socket 15 in a hinge block 16, the end of the crank stud having a screw threaded socket 17 for receiving an anchor stud bolt 18 that projects through a smooth bore 19 in the hinge block to hold the parts together but permit the crank block to rock under the conditions presently described.

The hinge block of each half of the frame comprises hinge lugs 20, spaced to mesh with like lugs on the mating block and provided with apertures 21 for receiving the hinge pin 4 (Fig. 1). The crank block 13 at the front, loose end of the frame is provided on its outer face with a crank stud 22 which is rotatably mounted in a socket 23 in the inner face of a latch block 24 for the left half of the frame or 25 for the right half of the frame, the end of the crank stud having a screw threaded socket 26 therein for receiving an anchor stud bolt 27 that projects through a smooth bore 28 in the hinge block to hold the parts together but permit the crank block to rock under the conditions which will presently be described.

The crank stud 22 is down-set from trunnion 11 and aligns with the crank stud 14 on the rear crank block 12, while the trunnions 10 and 11 also align but in a different plane, thereby permitting the head 5 to move on two different axes, as and for the purposes presently disclosed.

The paired crank blocks 12 and 13 are triangular with points directed rearwardly with respect to the head 5 and provided with aligning apertures 30, forming bearings for studs 31 on the ends of a yoke rod 32, the ends of the studs being threaded to carry nuts 33 (Fig. 6) at the outer faces of the crank blocks. The nuts are keyed to the studs by cotter pins 34 to prevent tightening of the nuts against the crank blocks and insure free axial movement of the yoke rod although securely anchoring the parts together.

On each yoke rod 32 is a yoke 35 having an aperture 36 therein within which is seated the base 37 of a hanger link 38, the upper end of the link being turned inwardly to a tip 39 which joins a like tip on a corresponding link attached to the other half of the frame, so that the hook 40′ of a suitable letting-in tackle may be applied to both links and support the frame evenly.

At each corner of the central head member 5 is an upstanding boss 40 having a screw theaded socket 41, and nesting within the head is a jaw comprising a pair of angular blocks 42—43, each having vertically spaced ears 44—45 over and underlying the head to anchor it against vertical movement relative to the head, the upper ear bearing on the head boss 40 and having a smooth bore 46, through which a stud 47 is projected to screw into the socket 41 in the head boss and hold the jaw block to the head while permitting limited pivotal movement of the block on the head. The rear corners of the jaw blocks bear against the rounded inner corners of the head 5 to provide solid backing for the jaws, the angles of the jaw blocks forming a pivotal contact which permits of automatic adjustment of the blocks under pressure on their forward faces without affecting their solid backing on the head. The bores 46 in the ears of the jaw blocks are enlarged to permit play of the ears on the studs 47, so that the rear corners of the jaw blocks may contact the heads 5 so that the heads may carry the thrust of the jaws.

The inner faces of the blocks 42—43 are concaved to form substantially quarter-round jaw faces 48—49, and the arrangement of the blocks is such that when assembled in the head 5 they form a vertically divided, substantially semi-circular gripping jaw on each half of the frame, so that when the clamp is closed about a pipe 50 (Figs. 2, 3, 4 and 5) the jaws combine to enclose and grip the pipe.

It is desirable that the clamp take hold only near the end of a pipe section, and to insure this positioning and also to avoid the necessity of manual closing of the clamp at each operation, I provide for primary application of the frame to the pipe at any point throughout its length, and automatic closing of the jaws only at the desired location adjacent the end of the pipe. In this way it is possible to apply the frame at any convenient point in the length of the pipe, then lift the frame idly over the pipe until it reaches the clamping position, when the automatic action is effected to close the jaws so that further lifting of the frame carries the pipe along with it.

To accomplish this it is necessary that the clamping jaws be normally spread sufficiently to permit their idle movement over the pipe. This is accomplished through the double pivot mounting of the head 5 heretofore described, in combination with springs 51, which are coiled about the ends of the yoke rod 32 at opposite sides of the yoke 33, one end of each spring being seated in a socket 52 in the adjacent side of the yoke 35 and the other end in a notch 53 in the under edge of the adjacent crank block 12 or 13. The combined strength of the four springs 51 (two on each half of the frame) is more than sufficient to support the weight of the clamp without yielding, consequently there is a tendency of the springs to hold the link yokes downwardly. This throws the points of the crank blocks downwardly and the trunnions outwardly, spreading the heads 5 on the respective halves of the frame and spacing the clamping jaws to provide their clearance about the pipe during initial travel of the clamp along the pipe. To overcome this spring tension and set the clamp jaws at the proper time, I provide each head 5 with an upstanding arm 54, the lower end of which may seat in a mortise 55 in the back of the head and be secured thereto by a screw or the like 56, which may extend through an aperture 57 in the arms and thread into a socket 58 in the back of the head 5, and the upper end of which is bent inwardly and provided with a feeler head 59, having an inwardly-opening, substantially circular recess 60 of slightly greater diameter than the pipe over which the clamp is moved and of less diameter than the coupling collar 61 on the end of the pipe, so that when the feeler head reaches the collar it is stopped thereby and holds the clamp head 5 against further travel along the pipe, the clamp head 5 being held by the feeler head 59. Continued uplifting of the clamp forces the jaws to gripping relation with the pipe against tension of the springs 51, so that the pipe is lifted with the clamp and may be carried to position for connection with the upper section of a string in the well or to a stack, according to whether the pipe is being set or pulled.

To insure a firm grip of the jaws on the pipe, I provide the jaw faces with teeth 62, preferably faced upwardly to bite the pipe under up-pull of the clamp and weight of the pipe.

While any suitable latching mechanism may be provided for holding the halves of the frame together when closed about the pipe, I prefer mechanism wherein the latch block 25 on one half of the frame comprises spaced ears 63—64, having registering apertures 65—65', 66—66', within which the shanks 67 of a handle 68 may be slidably mounted, the apertures 65' and 66' being extended outwardly from the face of the outer ear 64 by collars 69 to provide adequate bearings for the handle shanks and anchorage for tension springs 70 which surround the shanks and tend to urge them inwardly, one end of each spring being hooked into a socket 71 in a collar 69 and the other into a socket 72 in its handle shank. Outward movement of the handle is limited by a pin 67' which extends through one of the collars 69 and through a slot 68' in the shank 67.

The opposite latch block 24 carries an extension plate 73 which is adapted to fit between the ears 63, 64 when the halves of the frame are closed about the pipe, and has apertures 74 therein adapted to register with the apertures in the ears when the clamp is closed, so that the handle shanks may project through the registering apertures in the respective latch members to hold the clamps closed.

The operator may employ the handle 68 for manipulating the right half of the clamp as well as for operating the latch, and for his convenience in manipulation of the left half I provide the latch block 24 with a handle stud 75.

While I have in the foregoing description in the most part referred to the parts in singular, this has been with the reservation that reference to the various parts of one half of the device applies as well to the other, except where differentiation was specifically made, and while I have not encumbered the description with qualifications of specific terms, I do not waive any right to include elements of different specific structure within the scope of the invention.

While I have included description of operation of the clamp along with the description of its structure, the operation may be briefly stated as follows:—

Assuming the clamp to be constructed and assembled as described, and to be employed for setting pipe, and assuming a stack of pipe sections in the derrick, with their coupling collars at the top, the operator on the tubing board tilts a section of pipe against the finger board, swings the clamp over it and fastens the latch, the clamp usually being applied about 8 feet below the upper end of the pipe. The tackle then lifts the clamp, which slides over the pipe until the feeler heads engage the coupling collar, when movement of the clamp along the pipe is stopped and the jaws rocked against the pipe. As movement of the tackle is continuous, setting of the jaws is practically instantaneous, and lift of the clamp is uninterrupted, the only difference being that prior to the setting of the jaws the clamp moves idly over the pipe while afterwards the pipe is carried with the clamp.

The jaws having gripped the pipe, the latter is elevated, carried to position, and lowered to connect with pipe already in the well, after which the clamp is unlatched by an operator at the well platform and the clamp sent back for a new section of pipe.

When pipe is to be "pulled" the operation described is reversed, the operation of the clamp itself, however, being the same.

What I claim and desire to secure by Letters-Patent is:

1. In a clamp of the character described, a frame comprising a rocking head, a jaw carried by said head, and means engageable with an object to be clamped and operable on said head to effect clamping movement of the jaw.

2. In a clamp of the character described, a frame comprising a crank mounted head, a jaw carried by said head, means normally yieldingly retaining the head in open position, and means engageable with an object to be clamped to rock the head and effect closing movement of the jaw.

3. In a clamp of the character described, a frame comprising a hanger, a head, crank mounted on the hanger, a jaw carried by the head, yielding means normally retaining the head in open position, and means engageable with an object to be clamped and operable on the head to effect shifting of the jaw to functional position against tension of said yielding means.

4. In a clamp of the character described, a frame comprising a hanger, crank blocks connected with the hanger, means axially mounting the crank blocks, a head axially mounted on the crank blocks eccentrically of the block mounting, means normally yieldingly retaining the head in open position, a jaw carried by the head, and means on the head engageable with an object to be clamped to shift the head.

5. In a clamp of the character described, a frame comprising a hanger, crank blocks carried by the hanger, means axially mounting the crank blocks, a head axially mounted on the crank blocks eccentrically of the block mounting, a jaw carried by the head, yielding means connected with the hanger and with the crank blocks to normally retain the head in open position, and a stop member on the head, engageable with an object to be clamped to hold the head relative to the hanger and effect rocking movement of the jaw.

6. In a clamp of the character described, a frame comprising spaced, pivotally mounted, crank blocks, a head pivotally mounted between the crank blocks eccentrically of the block mounting, a jaw adjustably mounted on the head, a yoke member pivotally supporting the crank blocks, springs connected with the yoke member and crank blocks to normally yieldingly retain the head and jaw in a retracted position, and an arm extending from said head and engageable with an object to be clamped to effect shifting of the head against the tension of said spring.

7. In a clamp of the character described, a U-shaped head member comprising a base and ears merging into the base on curved lines, a jaw comprising sections each substantially triangular in cross section and having a substantially quarter-round, concave jaw seat, the angle of each section opposite its seat having knife-edge bearing on a curved juncture portion of the head, and means for pivotally mounting the jaw sections on said head.

8. In a clamp of the character described, a pair of hanger links, a yoke suspended from each link, spaced crank blocks pivotally mounted on each yoke, a head pivotally mounted on the respective crank blocks eccentrically of the yoke mounting, means hingedly connecting the hinge blocks leading from the respective hanger links, yielding means connected with each yoke and its crank blocks to normally retain the heads retracted, jaws on the respective heads for engaging a pipe, and feeler arms on said heads engageable with a projecting part of such pipe to hold the heads and effect closing movement of the jaws upon continued movement of the hanger links.

9. In a clamp of the character described, a pair of hingedly connected frame members, each comprising a crank mounted head and hanger link, a jaw on each head, spring connections between the heads and hanger links normally retaining the heads in spread relation to permit the jaws to move idly along a pipe when the clamp is elevated by the links, and feeler arms on the heads engageable with a collar on the pipe to stop the head and effect closing of the jaws through the crank mounting upon continued elevation of the clamp.

10. In a clamp of the character described, a frame, cranks on the frame, jaws on the cranks, means yieldingly urging the cranks to retain the jaws in open relation, and means engageable with the collar of a pipe to be clamped and operable on said cranks to shift the jaws to engagement with the pipe.

11. In a clamp of the character described, a frame comprising a hanger, crank blocks carried by the hanger, means axially mounting the crank blocks, a head axially mounted on the crank blocks eccentrically of the block mounting, a jaw carried by the head, and yielding means connected with the hanger and with the crank blocks to normally retain the head in open position.

12. In a clamp of the character described, side frame members, paired crank blocks pivotally mounted between the frame members, a jaw head pivotally mounted between the members of each pair of crank blocks eccentrically of the block mountings, and means pivotally supporting each pair of crank blocks on an axis eccentric to the block and head mountings.

13. In a clamp of the character described, side frame members, spaced pairs of crank blocks pivotally mounted between the frame members, a head pivotally mounted on each pair of blocks on an axis eccentric to that of the block mounting, a yoke pivotally connected with said blocks on an axis eccentric to the other two axes, means suspending the yokes, and means normally urging the crank blocks in a direction to spread said heads.

14. In a clamp of the character described, side frame members having transverse trunnion sockets, crank blocks having trunnions on their outer faces journalled in said sockets and having trunnions on their inner face, offset from the outer trunnions, heads located between the paired crank block having sockets pivotally seating said inner trunnions, jaws pivotally mounted on said heads on axes transverse to the trunnion axes, yokes pivotally connected with the crank blocks, and means suspending the yokes.

15. In a clamp of the character described, a pair of hingedly connected frame members adapted to close about a pipe, jaws on the frame members, having eccentric pivotal mountings on the frame members, means supporting the frame from the mountings, yielding means normally acting on the mountings to retain the jaws in spaced relation, and means engageable with a protuberance on the object to be clamped and operable on said mountings to shift the jaws to clamping relation.

In testimony whereof I affix my signature.

MARVIN B. DAVIS.